US008194582B2

(12) United States Patent
Scott

(10) Patent No.: US 8,194,582 B2
(45) Date of Patent: Jun. 5, 2012

(54) METHOD AND APPARATUS FOR HOSTING COMMERCIALLY-DERIVED PACKET ROUTERS ON SATELLITE PAYLOADS

(75) Inventor: James P. Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 603 days.

(21) Appl. No.: 12/418,429

(22) Filed: Apr. 3, 2009

(65) Prior Publication Data

US 2009/0323583 A1    Dec. 31, 2009

Related U.S. Application Data

(60) Provisional application No. 61/077,061, filed on Jun. 30, 2008.

(51) Int. Cl.
*H04B 7/185* (2006.01)
*H04L 12/66* (2006.01)
*H04L 12/28* (2006.01)

(52) U.S. Cl. ........ 370/316; 370/352; 370/353; 370/392; 370/466; 370/473; 370/535; 455/12.1

(58) Field of Classification Search ......................... None
See application file for complete search history.

(56) References Cited

U.S. PATENT DOCUMENTS

| | | | | |
|---|---|---|---|---|
| 6,335,920 | B1* | 1/2002 | Strodtbeck et al. | 370/318 |
| 7,783,788 | B1* | 8/2010 | Quinn et al. | 710/8 |
| 8,064,920 | B2* | 11/2011 | Bell et al. | 455/452.1 |
| 2003/0081615 | A1* | 5/2003 | Kohn et al. | 370/395.42 |
| 2004/0185775 | A1* | 9/2004 | Bell et al. | 455/12.1 |
| 2007/0147315 | A1* | 6/2007 | Khoury et al. | 370/338 |
| 2009/0022088 | A1* | 1/2009 | Wahlberg et al. | 370/321 |

OTHER PUBLICATIONS

IRIS JCTD Overview, Cisco Systems, Inc., 2006.
Wood, Lloyd, "CLEO: Cisco router in Low Earth Orbit" CAIA Seminar, Swinburne University of Technology, Feb. 8, 2006.

* cited by examiner

*Primary Examiner* — Jianye Wu
*Assistant Examiner* — Christine Duong
(74) *Attorney, Agent, or Firm* — Caven & Aghevli LLC

(57) ABSTRACT

The system contains an RF demodulator. A packet aggregation switching device is in communication with the RF demodulator. At least one packet processing engine is in communication with the RF demodulator. The packet aggregation switching device controls communication between the RF demodulator and the packet processing engine. An RF modulator may also be in communication with the packet processing engine along an egress path. The packet aggregation switching device may output traffic into the egress path.

20 Claims, 6 Drawing Sheets

METHOD AND APPARATUS FOR HOSTING COMMERCIALLY-DERIVED PACKET ROUTERS ON SATELLITE PAYLOADS

CROSS REFERENCE TO RELATED APPLICATION

This application claims priority from U.S. Provisional Application Ser. No. 61/077,061, filed Jun. 30, 2008, the contents of which are incorporated herein by reference.

STATEMENT REGARDING FEDERALLY SPONSORED RESEARCH OR DEVELOPMENT

This invention was made in part with Government support under contract number FA8808-04-C-0022 awarded by the Air Force. The Government may have certain rights in the invention.

FIELD

The present disclosure is generally related to satellite communications and, more particularly, is related to a method and apparatus for hosting commercially-derived packet routers on satellite payloads.

BACKGROUND

Satellites have become invaluable tools in such diverse fields as navigation, communications, environmental monitoring, weather forecasting, broadcasting and the like. Hundreds of man-made satellites now orbit the earth, and each year many more are launched from various nations around the world. Moreover, many homes, businesses and government organizations now use satellite systems on a daily basis for entertainment, communications, information gathering and other purposes.

Modern satellites have a metal or composite frame that houses a power source (e.g. one or more batteries, solar cells and/or the like) and various electronic components, as well as one or more antennas. The components generally include one or more "transponders", which are clusters containing one or more radio receivers, frequency translators and transmitters. The total bandwidth of the satellite is provided by the number of transponders, each of which may have a typical bandwidth of 30-70 MHz or so.

Unlike conventional analog transponder systems, regenerative payloads perform demodulation and remodulation of uplinked signals, recovering and processing not just the user signal, but also the user data embedded within the signal, enabling the payload to act upon it in a desired manner. Embedded data is most often used for autonomous routing in packet based systems and for security functions, as in many government satellites, or both. In particular, error detection and correction can be performed on demodulated data before it is retransmitted, thereby allowing regenerative satellite payloads to generally have good link performance. These characteristics and others make regenerative payloads the most efficient available in terms of control, bandwidth and power use. Regenerative systems do not typically provide universal signal compatibility as may be available from transponder payloads.

FIG. 1 is an illustration of a block diagram of a regenerative satellite payload communications system 10. The regenerative satellite payload communications system 10 includes an uplink demodulator 12 that receives incoming RF traffic 11. That traffic is forwarded to a time depermute block 14, a symbol derotate 16, a deinterlever 18, and an FEC decoder 20, which operate to extract information from the incoming traffic. The traffic moves forward through a data link layer frame reassembly 22, a multiplexer 24, a packet framer 26, and serializer/deserializer (SERDES) 28, to complete the ingress path 30 to the IP router 32. The egress path 34 begins with SERDES 28, the packet framer 27, the multiplexer 24, and a data link layer frame assembly block 29. The traffic then proceeds through a frame alignment buffer 36, a time permutate block 15, and a modulator 38 transmitting departing RF traffic 40. The time permutate block 15 cycles data through a TDM Map 17 and a TDM DeMap 19 having delay compensation 21.

Regenerative systems have been made backward compatible in some arrangements. While the transition from analog transponder payloads to much more efficient digital transponder payloads is clear, the path to provide even more efficient regenerative payload capability without dropping legacy system users or requiring the satellite to carry significantly more processing electronics has been difficult. To avoid loss of operation and to provide continuous revenue flow, existing satellite customers generally desire to transition transponder end users to regenerative services in a gradual manner, over the many-year life span of an expensive satellite asset.

SUMMARY

Embodiments of the present disclosure provide an improved system and method for providing regenerative satellite payload communications. Briefly described, in architecture, one embodiment of the system, among others, can be implemented as follows. The system contains an RF demodulator. A packet aggregation switching device is in communication with the RF demodulator. At least one packet processing engine is in communication with the RF demodulator. The packet aggregation switching device controls communication between the RF demodulator and the packet processing engine.

In one embodiment of the disclosure, the system includes an RF modulator in communication with the packet processing engine along an egress path. In such embodiment, the packet aggregation switching device preferably outputs traffic into the egress path.

In another embodiment, the system further includes an extraction device in communication with the RF demodulator, wherein the extraction device extracts information relative to traffic received through the RF demodulator. In such embodiment, the extraction device preferably extracts data from the traffic received through the RF demodulator and wherein the data indicates whether the traffic is packet flow or circuit flow. If desired, the extraction device further comprises data link layer frame reassembly.

In yet another embodiment, the packet aggregation switching device further comprises a programmable table used to provide a policy-driven mapping of arriving packet flows to an associated packet processing engine. In such embodiment the packet aggregation switching device preferably further comprises a virtual interface to link-layer terminal ID mapping table in communication with the protection switch circuit to IP router line card mapping table. Also, if desired, the system may further comprise a remote interface in communication with the virtual interface to link-layer terminal ID mapping table and the protection switch circuit to IP router line card mapping table.

The present disclosure can also be viewed as providing methods for providing regenerative satellite payload communications. In this regard, one embodiment of such a method, among others, can be broadly summarized by the following steps: receiving a plurality of signals, wherein the plurality of signals comprises signal traffic; segregating the signal traffic into circuit traffic and packet traffic; converting packet traffic into bidirectional and symmetric packet aggregate flows; merging circuit traffic and bidirectional and symmetric packet aggregate flows into merged traffic; and providing downlink packet scheduling for the merged traffic.

In such embodiment, the method may further include the step of extracting data from the signal traffic to determine which signal traffic is the circuit traffic and which signal traffic is the packet traffic, and/or the step of dynamically reassignable mapping of packet flows to network layer virtual interface IDs. In such embodiments, the step of segregating the signal traffic preferably further includes segregating the signal traffic with a packet aggregation switching device, Also, if desired the method may further include the step of mapping which of a plurality of packet processing engines is responsible for processing a given per-terminal packet flow.

The present disclosure also describes another embodiment of a system for providing regenerative satellite payload communications. The system includes a means for receiving a plurality of signals, wherein the plurality of signals comprises signal traffic, a means for segregating the signal traffic into circuit traffic and packet traffic, a means for converting packet traffic into bidirectional and symmetric digital packet aggregate flows, a means for merging the circuit traffic and the bidirectional and symmetric digital packet aggregate flows to create merged traffic, and a means for providing downlink packet scheduling for the merged traffic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
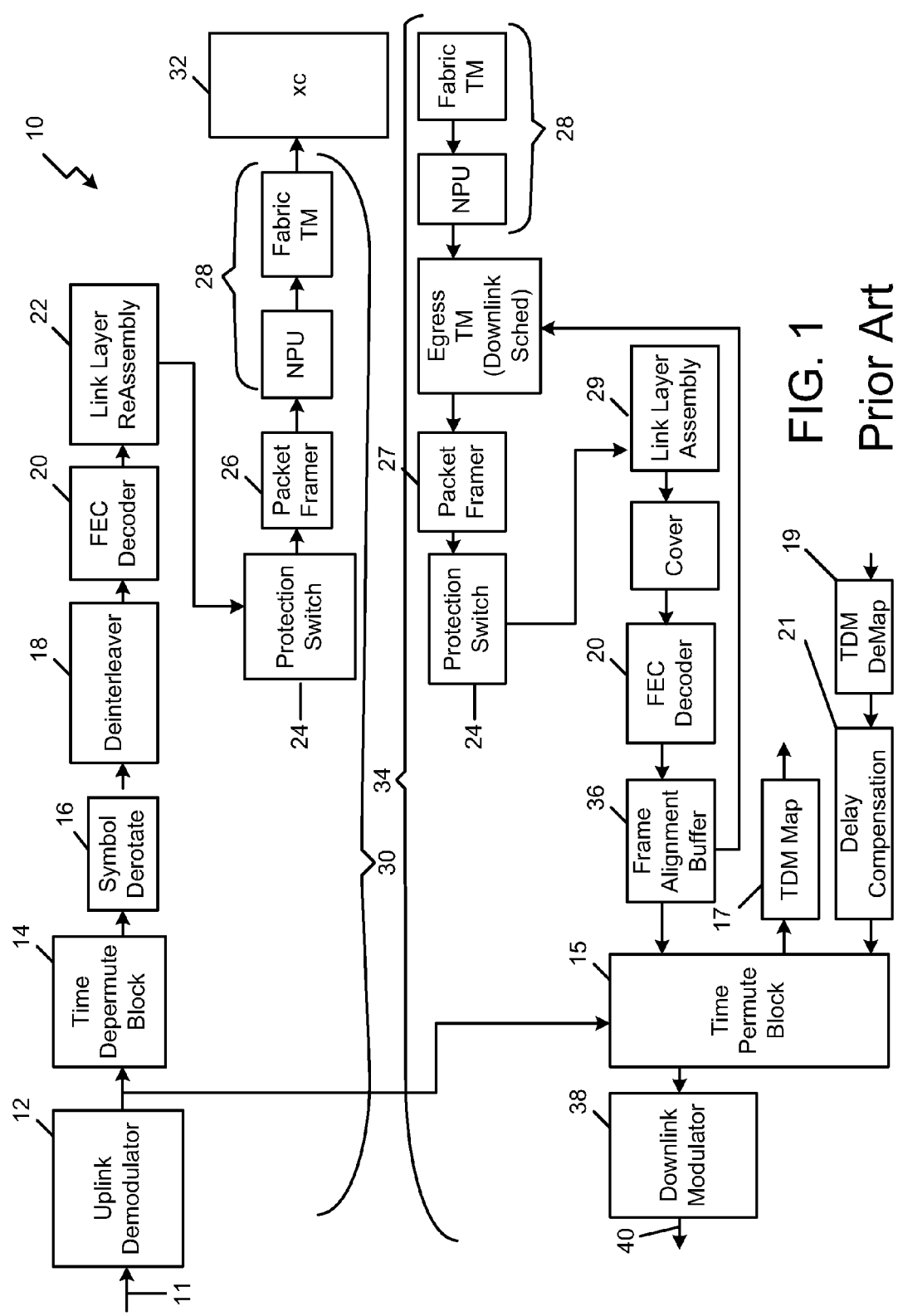
FIG. 1 is an illustration of a block diagram of a typical regenerative satellite payload communications system.
Figure 2:
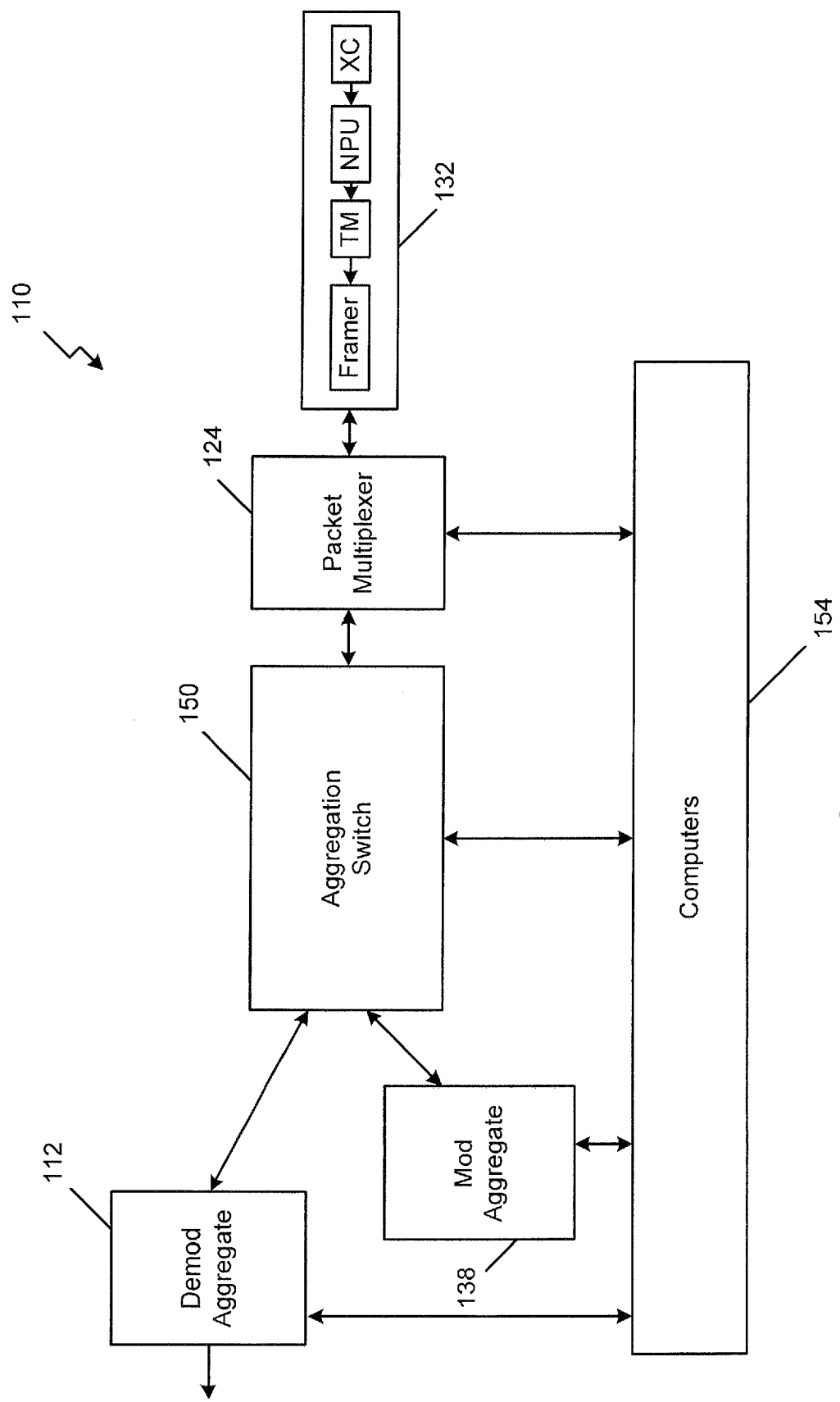
FIG. 2 is an illustration of a block diagram of a regenerative satellite payload communications system, in accordance with a first exemplary embodiment of the present disclosure.

FIG. 2 is an illustration of a block diagram of a regenerative satellite payload communications system 110, in accordance with a first exemplary embodiment of the present disclosure. The regenerative satellite payload communications system 110 contains an RF demodulator 112. A packet aggregation switching device 150 is in communication with the RF demodulator 112. At least one packet processing engine 132 is in communication with the RF demodulator 112. The packet aggregation switching device 150 controls communication between the RF demodulator 112 and the packet processing engine 132. More specifically, the packet aggregation switching device 150 may direct packet traffic to the packet processing engine 132 while directing circuit traffic to a suitable processor.

The regenerative satellite payload communications system 110 may further include an RF modulator 138. The packet aggregation switching device 150 may direct packet traffic from the packet processing engine 132 while directing circuit and packet traffic directly into an egress path of the satellite communication, for transmission through the RF modulator 138. The RF demodulator 112 may further include hardware to extract information from the incoming traffic to allow the packet aggregation switching device 150 to identify which traffic is packet flow and which traffic is circuit flow.

As shown in FIG. 2, at least one packet multiplexer 124 may be located between the packet aggregation switching device 150 and the packet processing engine 132. The packet multiplexer 124 may be, for example, a protection switch. Also, while only one packet processing engine 132 is required, a plurality of packet processing engines 132 may be useful in some situations. Multiple packet processing engines 132 may be adopted to create a distributed router architecture where the packet multiplexer 124 is used to interconnect various packet processing engines 132, where the packet aggregation switching device 150 may be used to determine which packet processing engine 132 is responsible for processing a given per-terminal packet flow. One or more programmable devices 154 may interface with various elements of the regenerative satellite payload communications system 110 to track and/or control operation.

Figure 3:
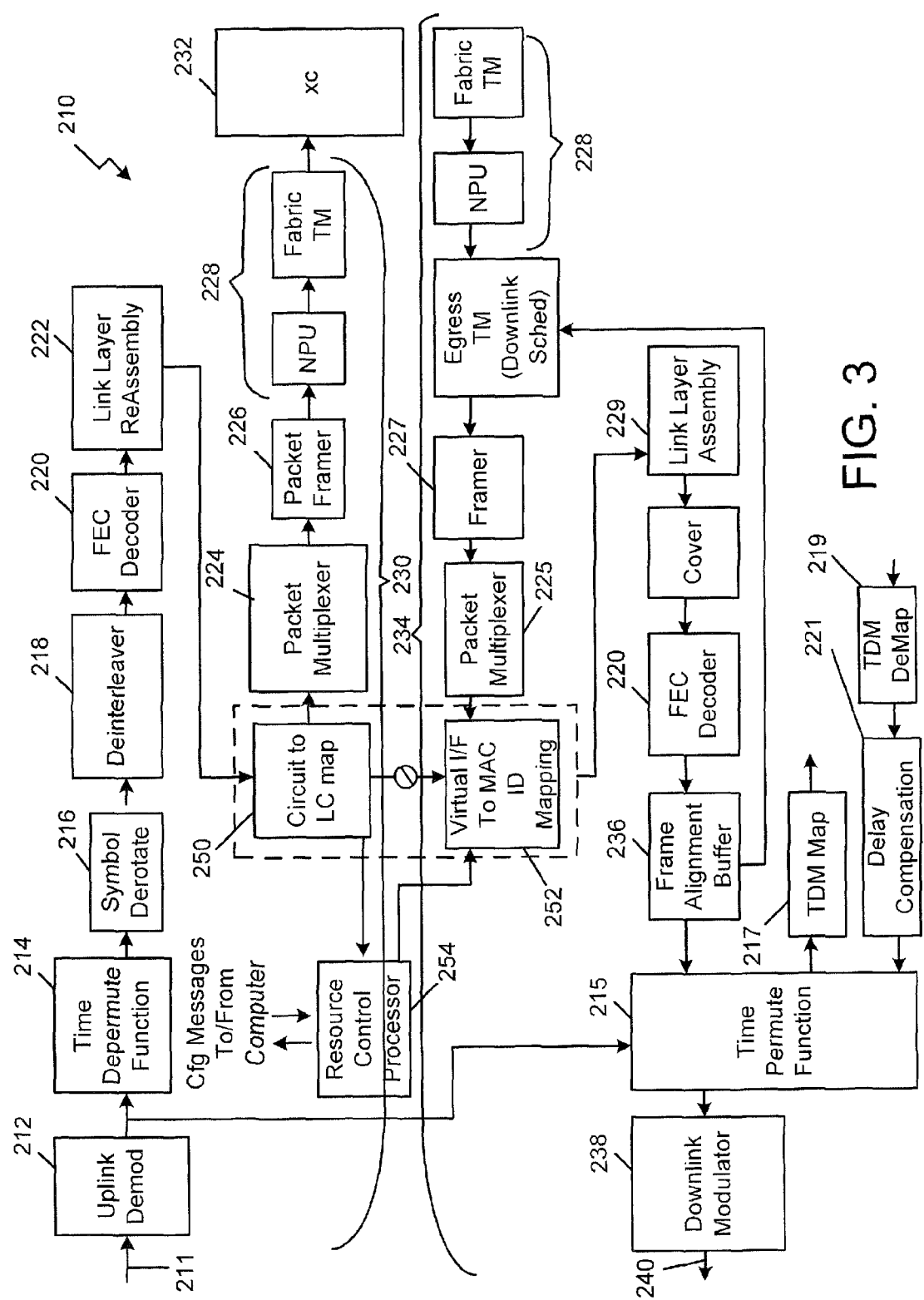
FIG. 3 is an illustration of a block diagram of a regenerative satellite payload communications system, in accordance with a second exemplary embodiment of the present disclosure.

FIG. 3 is an illustration of a block diagram of a regenerative satellite payload communications system 210, in accordance with a second exemplary embodiment of the present disclosure. The regenerative satellite payload communications system 210 includes an uplink demodulator 212 that receives incoming RF traffic 211. That traffic is forwarded to a time depermute function 214, a symbol derotate 216, a deinterleaver 218, and an FEC decoder 220, which operate to extract information from the incoming traffic. The arriving packet traffic moves forward through a data link layer frame reassembly 222 to a packet multiplexer circuit to IP router line card mapping table 250. The packet multiplexer circuit to IP router line card mapping table 250 segregates the traffic received from the data link layer frame reassembly 222 into packet traffic forwarded through to a packet multiplexer 224 and circuit traffic forwarded to a virtual interface to link-layer terminal ID mapping table 252. The packet multiplexer 224 may be, for example, a pass-through mode protection switch. The packet traffic forwarded through the packet multiplexer 224 proceeds through a packet framer 226, and SERDES 228, to complete the ingress path 230 to the packet processing engine 232.

The egress path 234 begins with SERDES 228, the packet framer 227, and the egress packet multiplexer 225. Packet traffic output from the egress packet multiplexer 225 is received by the virtual interface to link-layer terminal ID mapping table 252, where it is merged with circuit traffic from the protection switch circuit to IP router line card mapping table 250. The protection switch circuit to IP router line card mapping table 250 and the virtual interface to link-layer terminal ID mapping table 252 may be controlled and monitored through a resource control processor 254. The merged traffic proceeds from the virtual interface to link-layer terminal ID mapping table 252 to a data link layer assembly block 229, through a frame alignment buffer 236, another time permutate block 215, and a modulator 238 that transmits departing RF traffic 240. The time permutate block 215 cycles data through a TDM Map 217 and a TDM DeMap 219 having delay compensation 221.

As constructed, the regenerative satellite payload communications system 210 is able to segregate arriving multiservice traffic into circuit versus packet flows and directed to the appropriate subsystems. Asymmetric and unidirectional traffic is converted to bidirectional and symmetric broadband packet aggregate flows, allowing for high reuse of existing commercial routers with minimized expense.

Figure 4:
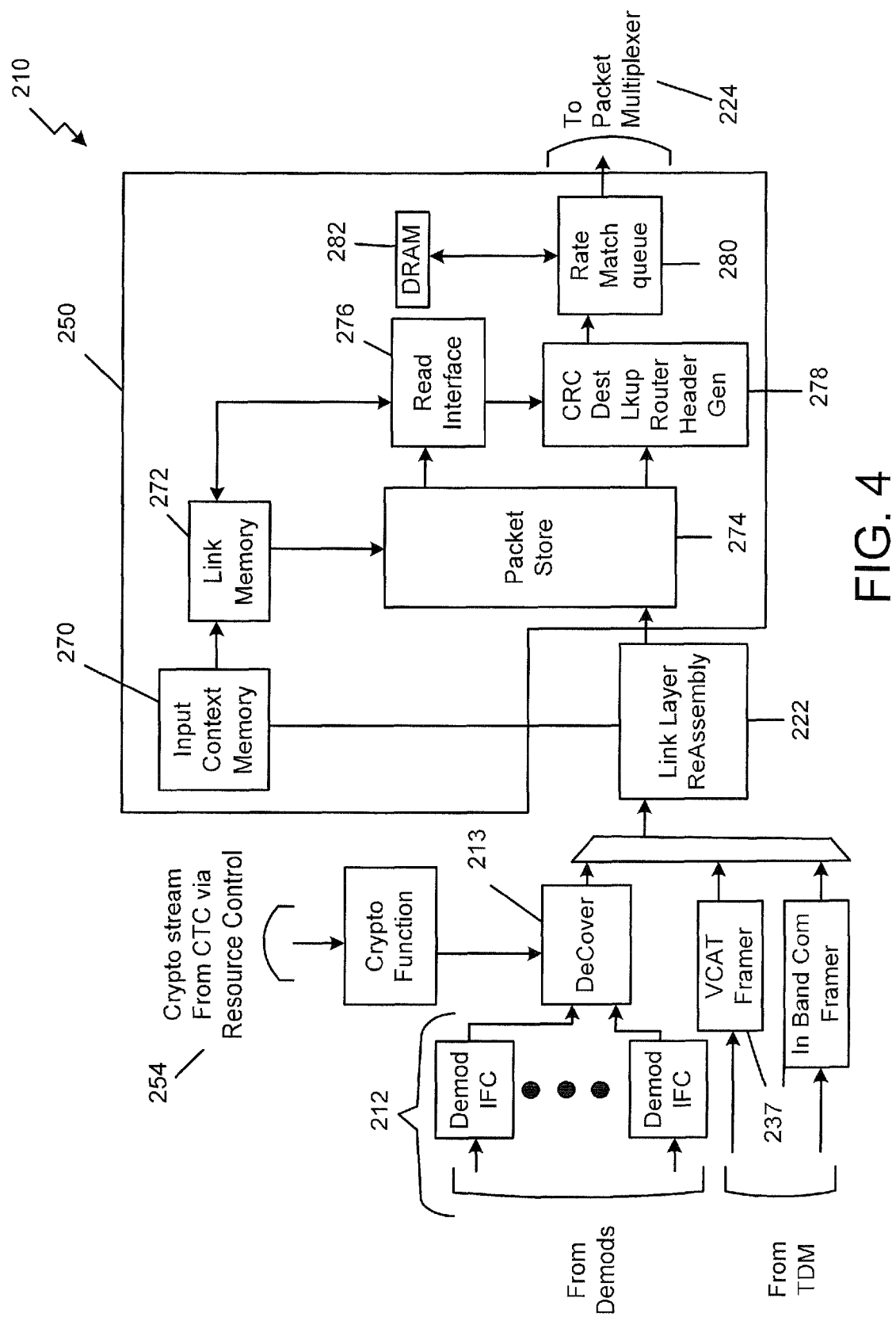
FIG. 4 is an illustration of a block diagram of a portion of the regenerative satellite payload communications system of FIG. 3, in accordance with a second exemplary embodiment of the present disclosure.

FIG. 4 is an illustration of a block diagram of an ingress portion of the regenerative satellite payload communications system 210 of FIG. 3, in accordance with a second exemplary embodiment of the present disclosure. FIG. 4 is a more detailed view of the protection switch circuit to IP router line card mapping table 250 shown in FIG. 3. Arriving uplink and crosslink traffic is demodulated at the uplink demodulators 212, decovered by a decover 213, and deframed by the framers 237 in order to distinguish circuit traffic from packet traffic. All packet traffic is then multiplexed and fed into a data link layer reassembly 222. The traffic entering the protection switch circuit to IP router line card mapping table 250 is received from the data link layer reassembly 222 and goes to a packet storage device 274, while transmitting data to an input context memory device 270. The data link layer reassembly 222 may be, for example, a frame detection and pad detection device.

The resulting aggregated packet flows are buffered in the packet storage device 274 to await packet processing. The input context memory device 270 sends data to a link memory device 272. The packet storage device 274 sends information to a read interface 276, which transmits data to the link memory device 272 and sends mapped per-terminal traffic data to a CRC control logic 278. The CRC control logic 278 may include a destination linkup router. The link memory device 272, in turn, transfers data back into the packet storage device 274. The traffic continues from the packet storage device 274 to the CRC control logic 278 and on to a rate match queue 280. The CRC control logic 278 also sends data to the remote interface 254 (shown in FIG. 3). The rate match queue 280 exchanges traffic data with a DRAM device 282 while sending mapped and aggregated traffic to the packet multiplexer 224, which is also shown in FIG. 3.

Figure 5:
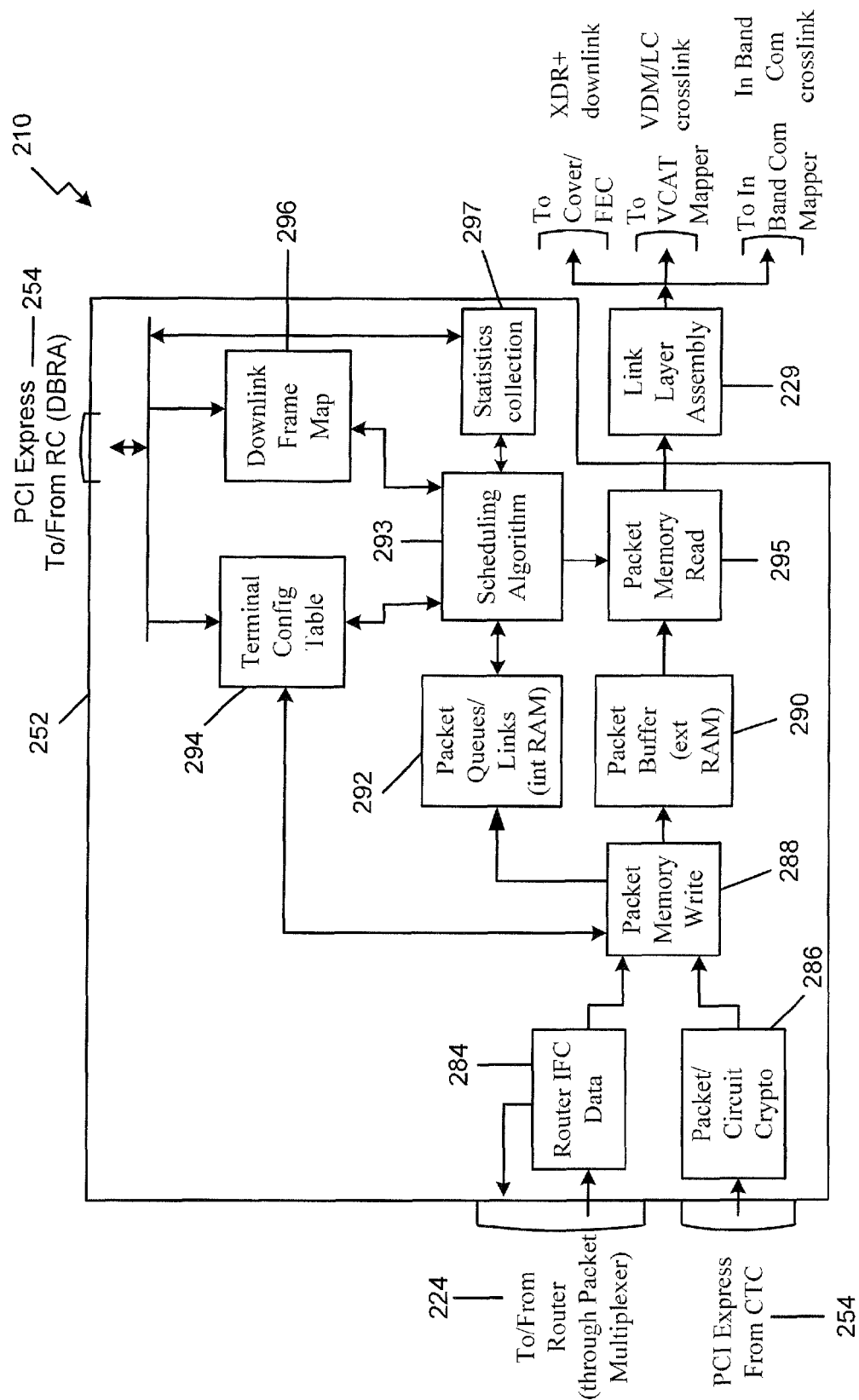
FIG. 5 is an illustration of a block diagram of a portion of the regenerative satellite payload communications system of FIG. 3, in accordance with a second exemplary embodiment of the present disclosure.

FIG. 5 is an illustration of a block diagram of an egress portion of the regenerative satellite payload communications system 210 of FIG. 3, in accordance with a second exemplary embodiment of the present disclosure. FIG. 5 is a more detailed diagram of the virtual interface to link-layer terminal ID mapping table 252 shown in FIG. 3. As shown in both FIG. 3 and FIG. 5, the virtual interface to link-layer terminal ID mapping table 252 receives traffic along the egress path from the packet processing engine 232 through the packet multiplexer 224 and into a router IFC data device 284. The virtual interface to link-layer terminal ID mapping table 252 also receives traffic through the remote interface 254 at a packet/circuit crypto device 286. The router IFC data device 284 and the packet/circuit crypto device 286 funnels traffic through a packet memory write device 288. The packet memory write device 288 forwards traffic through a packet buffer 290 while sending data to a packet queue 292 and exchanging data with a terminal configuration table 294. The packet queue 292 and the terminal configuration table 294, along with a downlink frame map 296, communicating with a link-layer statistics collection device 297, feed data into a scheduling algorithm 293. The terminal configuration table 294, the downlink frame map 296, and the link-layer statistics collection device 297 also receive data from the scheduling algorithm 293 as well as the resource control processor 254. The traffic is output from the packet buffer 290 to a packet memory read device 295 and scheduling data is output from the scheduling algorithm 293 to the packet memory read device 295, which sends the resultant demapped and disaggregated traffic through to the data link layer encoder 226, shown in both FIG. 3 and FIG. 5.

While specific devices have been identified herein to enable one implementation of the present disclosure, those having ordinary skill in the art will recognize that other devices may be adopted to accomplish the same process.

Figure 6:
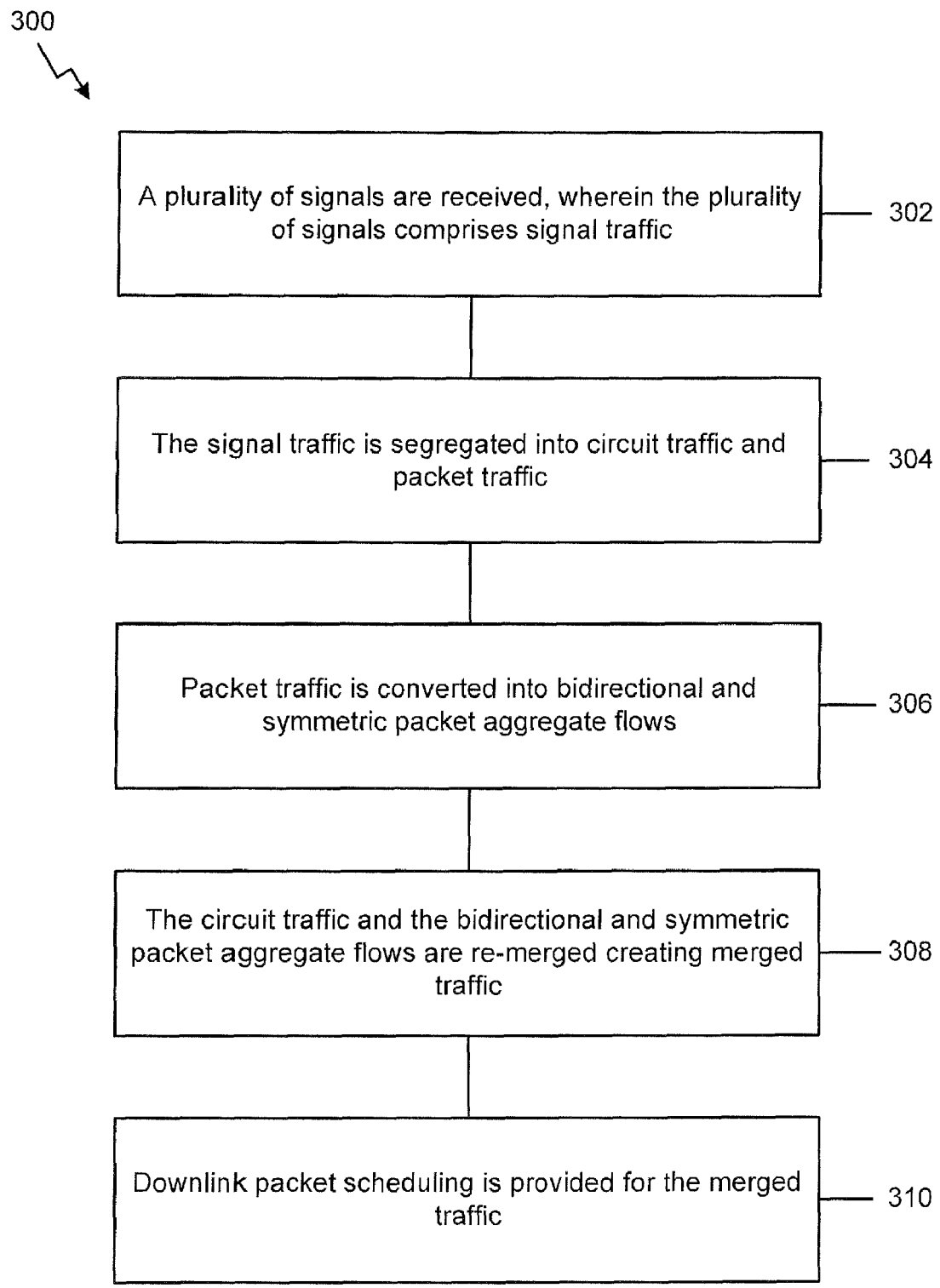
FIG. 6 is an illustration of a flow chart for a method of providing the regenerative satellite payload communications of FIG. 3, in accordance with the second exemplary embodiment of the disclosure.

FIG. 6 is a flowchart 300 illustrating a method of providing the above mentioned regenerative satellite payload communications 210 in accordance with the second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 302, a plurality of signals are received, wherein the plurality of signals comprises signal traffic. The signal traffic is segregated into circuit traffic and packet traffic (block 304). Packet traffic is converted into bidirectional and symmetric packet aggregate flows (block 306). The circuit traffic and the bidirectional and symmetric packet aggregate flows are re-merged creating merged traffic (block 308). Downlink packet scheduling is provided for the merged traffic (block 310).

As constructed, this method of providing regenerative satellite payload communications 210 is able to segregate arriving multiservice traffic into circuit versus packet flows and directed to the appropriate subsystems. Asymmetric and unidirectional traffic is converted to bidirectional and symmetric broadband packet aggregate flows, allowing for high reuse of existing commercial routers and similar existing commercial communications devices.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. A system for regenerative satellite payload communications, the system comprising:
   an RF demodulator;
   a packet aggregation switching device in communication with the RF demodulator and comprising:
      a programmable table used to provide a policy-driven mapping of arriving packet flows to an associated packet processing engine; and
      a virtual interface to link-layer terminal ID mapping table in communication with a protection switch circuit to IP router line card mapping table; and
   at least one packet processing engine in communication with the RF demodulator, wherein the packet aggregation switching device controls communication between the RF demodulator and the packet processing engine.

2. The system of claim 1, further comprising an RF modulator in communication with the packet processing engine along an egress path.

3. The system of claim 2, wherein the packet aggregation switching device outputs traffic into the egress path.

4. The system of claim 1, further comprising an extraction device in communication with the RF demodulator, wherein the extraction device extracts information relative to traffic received through the RF demodulator.

5. The system of claim 4, wherein the extraction device extracts data from the traffic received through the RF demodulator and wherein the data indicates whether the traffic is packet flow or circuit flow.

6. The system of claim 4, wherein the extraction device further comprises a data link layer frame reassembly.

7. The system of claim 1, further comprising a remote interface in communication with the virtual interface to link-layer terminal ID mapping table and the protection switch circuit to IP router line card mapping table.

8. A method for providing regenerative satellite payload communications, the method comprising the steps of:
   receiving a plurality of signals, wherein the plurality of signals comprises signal traffic;
   segregating the signal traffic into circuit traffic and packet traffic;
   converting packet traffic into bidirectional and symmetric digital packet aggregate flows using a programmable table to provide a policy-driven mapping of arriving packet flows to an associated packet processing engine;
   merging the circuit traffic and the bidirectional and symmetric digital packet aggregate flows using a virtual interface to link-layer terminal ID mapping table in communication with a protection switch circuit to IP router line card mapping table to create merged traffic; and
   providing downlink packet scheduling for the merged traffic.

9. The method of claim 8, further comprising the step of extracting data from the signal traffic to determine which signal traffic is the circuit traffic and which signal traffic is the packet traffic.

10. The method of claim 8, further comprising the step of dynamically reassignable mapping of link-layer terminal IDs to network layer virtual interface IDs.

11. The method of claim 8, wherein the step of segregating the signal traffic further comprises segregating the signal traffic with a packet aggregation switching device.

12. The method of claim 8, further comprising the step of mapping which of a plurality of packet processing engines is responsible for processing a given per-terminal packet flow.

13. The method of claim 8, wherein the step of merging is performed with the virtual interface to link-layer terminal ID mapping table.

14. A system for regenerative satellite payload communications, the system comprising:
   an RF demodulator;
   a packet aggregation switching device in communication with the RF demodulator and comprising:
      a programmable table used to provide a policy-driven mapping of arriving packet flows to an associated packet processing engine; and
      a remote interface in communication with a virtual interface to link-layer terminal ID mapping table and a protection switch circuit to IP router line card mapping table; and
   at least one packet processing engine in communication with the RF demodulator, wherein the packet aggregation switching device controls communication between the RF demodulator and the packet processing engine.

15. The system of claim 14, further comprising an RF modulator in communication with the packet processing engine along an egress path.

16. The system of claim 15, wherein the packet aggregation switching device outputs traffic into the egress path.

17. The system of claim 14, further comprising an extraction device in communication with the RF demodulator, wherein the extraction device extracts information relative to traffic received through the RF demodulator.

18. The system of claim 17, wherein the extraction device extracts data from the traffic received through the RF demodulator and wherein the data indicates whether the traffic is packet flow or circuit flow.

19. The system of claim 17, wherein the extraction device further comprises a data link layer frame reassembly.

20. The system of claim 14, wherein the packet aggregation switching device further comprises the virtual interface to link-layer terminal ID mapping table in communication with the protection switch circuit to IP router line card mapping table.

* * * * *